United States Patent
Takeda et al.

(10) Patent No.: US 6,792,246 B2
(45) Date of Patent: Sep. 14, 2004

(54) NONCONTACT TRANSMITTING APPARATUS

(75) Inventors: Munehisa Takeda, Tokyo (JP); Jyunichi Aizawa, Tokyo (JP); Takeshi Araki, Tokyo (JP); Hideaki Shoji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 519 days.

(21) Appl. No.: 09/795,320

(22) Filed: Mar. 1, 2001

(65) Prior Publication Data

US 2001/0029167 A1 Oct. 11, 2001

(30) Foreign Application Priority Data

Apr. 10, 2000 (JP) ........................................ 2000-108469

(51) Int. Cl.$^7$ ................................................ H04B 5/00
(52) U.S. Cl. .................. 455/41.1; 455/90.1; 455/575.1; 455/569.1; 455/575.3; 455/575.5; 455/90.3; 455/556; 455/557; 455/566
(58) Field of Search ............................... 455/41.1, 90.1, 455/575.1, 569.1, 566, 556, 557

(56) References Cited

U.S. PATENT DOCUMENTS

| | | | |
|---|---|---|---|
| 5,229,652 A | | 7/1993 | Hough |
| 5,550,754 A | * | 8/1996 | McNelley et al. ........ 348/14.01 |
| 5,966,404 A | * | 10/1999 | Yokota et al. ............... 375/219 |
| 6,073,033 A | * | 6/2000 | Campo ......................... 455/566 |
| 6,321,067 B1 | * | 11/2001 | Suga et al. .................. 455/41.2 |
| 6,377,818 B2 | * | 4/2002 | Irube et al. ............... 455/556.1 |
| 6,424,843 B1 | * | 7/2002 | Reitmaa et al. ............. 455/566 |
| 6,486,862 B1 | * | 11/2002 | Jacobsen et al. ............... 345/88 |
| 6,518,993 B2 | * | 2/2003 | Kerai et al. ............... 348/14.01 |
| 6,593,956 B1 | * | 7/2003 | Potts et al. ............... 348/14.09 |
| 6,636,748 B2 | * | 10/2003 | Monroe .................... 348/14.02 |

FOREIGN PATENT DOCUMENTS

| | | |
|---|---|---|
| EP | 541 323 | 5/1993 |
| EP | 975 132 | 1/2000 |
| JP | 9-26834 | 1/1997 |
| JP | 9-213550 | 8/1997 |

* cited by examiner

*Primary Examiner*—Marceau Milord
(74) *Attorney, Agent, or Firm*—Leydig, Voit & Mayer, Ltd.

(57) ABSTRACT

A noncontact transmitting apparatus includes first and second noncontact transmitting units mounted on a main device and an attachment device, respectively. The second noncontact transmitting unit is removably attachable to the first noncontact transmitting unit for enabling noncontact signal transfer between the main device and the attachment device. Each of the noncontact transmitting units includes a power coil and a signal coil. The power coil is wound on a first core to supply power from the main device to the attachment device by electromagnetic induction. The first cores of the first and second noncontact transmitting units face each other at a first position when the attachment device is loaded on the main device. The signal coil is wound on a second core for signal transfer between the main device and the attachment device by electromagnetic induction. The second cores of the first and second noncontact transmitting units face each other at a second position when the attachment device is loaded on the main device. When the attachment device is rotated about the first core by a specified angle, the signal coil of the second noncontact transmitting unit is moved from the second position. This makes it possible for the main device such as a cellular phone, and the attachment device, such as a camera, to transfer power and signals between them with a simple configuration with high reliability when the attachment device is loaded on the main device.

16 Claims, 15 Drawing Sheets

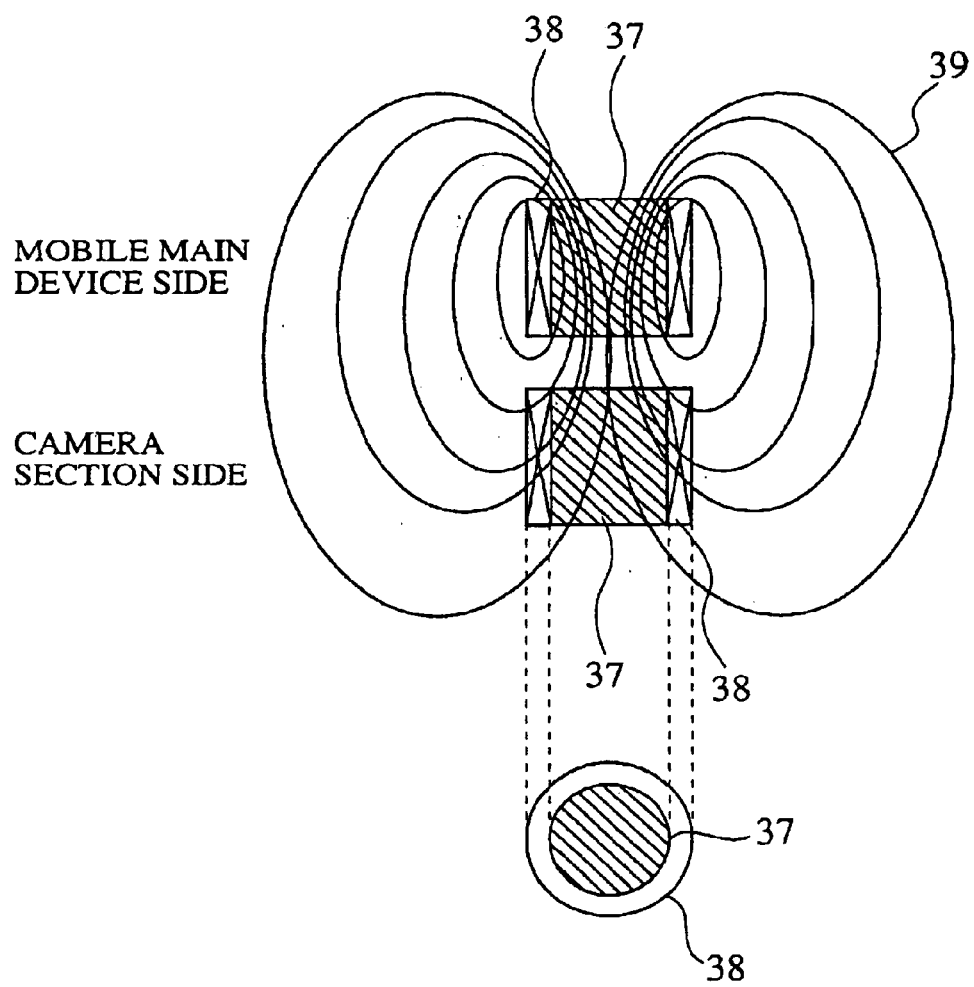

NONCONTACT TRANSMITTING APPARATUS

BACKGROUND OF THE INVENTION

1. Field of the Invention

The present invention relates to a noncontact transmitting apparatus for making noncontact connections between a main device and an attachment device like a camera, which main device includes a mobile information terminal like a cellular phone or mobile personal computer, a game machine, an AV (audio-visual) machine, a medical device, an industrial machine and an environmental monitoring device.

2. Description of Related Art

Conventionally, although a cellular phone with an integrated a camera is known, there have been few cellular phones with an attachable/detachable camera.

As for a mobile personal computer, Japanese patent application laid-open No. Hei. 9-26834 discloses a technique that transfers power and data using electromagnetic induction. The mobile personal computer has two sets of a magnetic core and coil, each attached to the backs of its body and display about its hinge to transfer power and data from the body to the display by electromagnetic induction, thereby reducing disconnections that can happen due to stress imposed by the hinge.

With the foregoing arrangements, the conventional mobile information terminals have the following problems. First, as for the cellular phone, since the camera is embedded therein, it cannot be attached to the cellular phone only when needed, and hence cannot be detached to utilize it for other purposes.

As for the conventional technique disclosed in Japanese patent application laid-open No. Hei. 9-26834, although it can transfer power and data from the body to the display of the mobile personal computer, it is not designed for carrying out noncontact transfer of power and data from the main body of the cellular phone to the camera. Thus, it is not applicable to the technique for enabling the camera to be attached to and detached from the cellular phone.

SUMMARY OF THE INVENTION

The present invention is implemented to solve the foregoing problem. It is therefore an object of the present invention to provide a noncontact transmitting apparatus transferring signals and power between a mobile device and its attachable/detachable camera with a simple configuration and high reliability, when the camera is mounted on the mobile device.

According to a first object of the present invention, there is provide a noncontact transmitting apparatus comprising: a first noncontact transmitting unit mounted on a main device; a second noncontact transmitting unit mounted on an attachment device, the second noncontact transmitting unit being removably attachable to the first noncontact transmitting unit, for enabling noncontact signal transfer between the main device and the attachment device, wherein each of the noncontact transmitting units comprises: a power coil wound on a first core to supply power from the main device to the attachment device by means of electromagnetic induction effect, wherein the first core of the first noncontact transmitting unit and the first core of the second noncontact transmitting unit face each other at a first opposite position when the attachment device is loaded on the main device; and at least one signal coil wound on at least one second core to carry out signal transfer between the main device and the attachment device by means of electromagnetic induction effect, wherein the second core of the first noncontact transmitting unit and the second core of the second noncontact transmitting unit face each other at a second opposite position when the attachment device is loaded on the main device.

Here, the second noncontact transmitting unit may be rotatably attached to the first noncontact transmitting unit about the first core, and when it is rotated about the first core by a specified angle, the signal coil of the second noncontact transmitting unit may be shifted from the second opposite position.

Each of the noncontact transmitting units may further comprise means for fixing and integrating the power coil and the signal coil at their specified positions.

The power coil may disposed close to a facing surface of the first core, and the signal coil may be disposed close to a facing surface of the second core.

The main device may further comprise an antenna for transmitting and receiving a signal.

Each of the noncontact transmitting units may further comprise: a circuit board that includes, in addition to the power coil and the signal coil, conductor patterns to the power coil and signal coil, and ground through holes; a flexible printed circuit for transmitting signals to the conductor patterns; and chip capacitors for feeding an antenna signal passing through the flexible printed circuit back to ground through the ground through holes.

Each of the noncontact transmitting units may further comprise: means for fixing and integrating the power coil, the signal coil, the conductor patterns and the chip capacitors at their specified positions; and a metallic thin-film shield for covering the noncontact transmitting unit, which is integrated by the means, to prevent the antenna signal from penetrating the noncontact transmitting unit.

The circuit board may consist of a double-layer circuit board, and the conductor patterns may be formed on an internal layer of the double-layer circuit board.

Each of the noncontact transmitting units may further comprise means for fixing and integrating the power coil and the signal coil at their specified positions.

Each of the noncontact transmitting units may comprise a metallic thin-film shield for covering said noncontact transmitting unit to prevent the antenna signal from penetrating said noncontact transmitting unit.

The metallic thin-film shield may comprises hole on its facing surface.

The metallic thin-film shield may comprise lattice-like patterns on its facing surface.

The metallic thin-film shield may be covered with an insulating coating.

The first noncontact transmitting unit may further comprise a magnetic shield for preventing leakage flux from the first noncontact transmitting unit from affecting a radio frequency circuit in the main device.

The main device may consist of a cellular phone and the attachment device may comprise a camera.

According to a second aspect of the present invention, there is provide an information system comprising: a main device; an attachment device; a first noncontact transmitting unit mounted on the main device; a second noncontact transmitting unit mounted on the attachment device, the second noncontact transmitting unit being removably attachable to the first noncontact transmitting unit, for enabling noncontact signal transfer between the main device and the attachment device, wherein each of the noncontact transmitting units comprises: a power coil wound on a first core to supply power from the main device to the attachment device by means of electromagnetic induction effect, wherein the first core of the first noncontact transmitting unit and the first core of the second noncontact transmitting unit face each other at a first opposite position when the attachment device is loaded on the main device; and at least one signal coil wound on at least one second core to carry out signal transfer between the main device and the attachment device by means of electromagnetic induction effect, wherein the second core of the first noncontact transmitting unit and the second core of the second noncontact transmitting unit face each other at a second opposite position when the attachment device is loaded on the main device.

BRIEF DESCRIPTION OF THE DRAWINGS

FIG. 10 is a cross-sectional view illustrating the operating principle of the noncontact transmitting apparatus of the mobile information terminal in the embodiment 1 in accordance with the present invention;

FIGS. 14A and 14B are plan views showing shield patterns of the facing surface of a metallic thin-film shield formed on the noncontact transmitting unit of an embodiment 3 in accordance with the present invention, wherein FIG. 14A shows a shield pattern formed on a power noncontact connector, and FIG. 14B shows a shield pattern formed on a signal noncontact connector;

DETAILED DESCRIPTION OF THE PREFERRED EMBODIMENTS

The invention will now be described with reference to the accompanying drawings.

Embodiment 1

Figure 1:
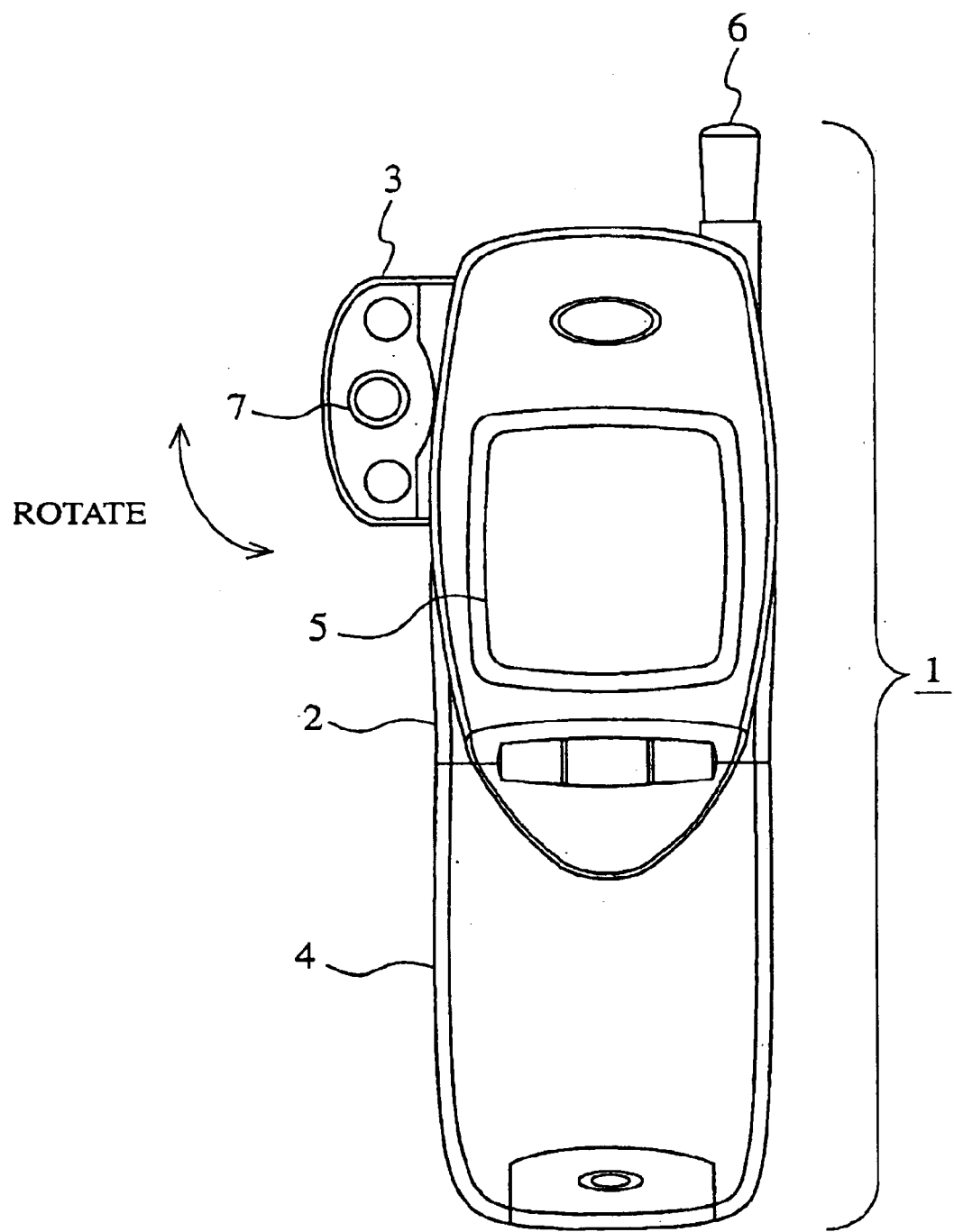
FIG. 1 is a front view showing a mobile information terminal of an embodiment 1 in accordance with the present invention.
Figure 2:
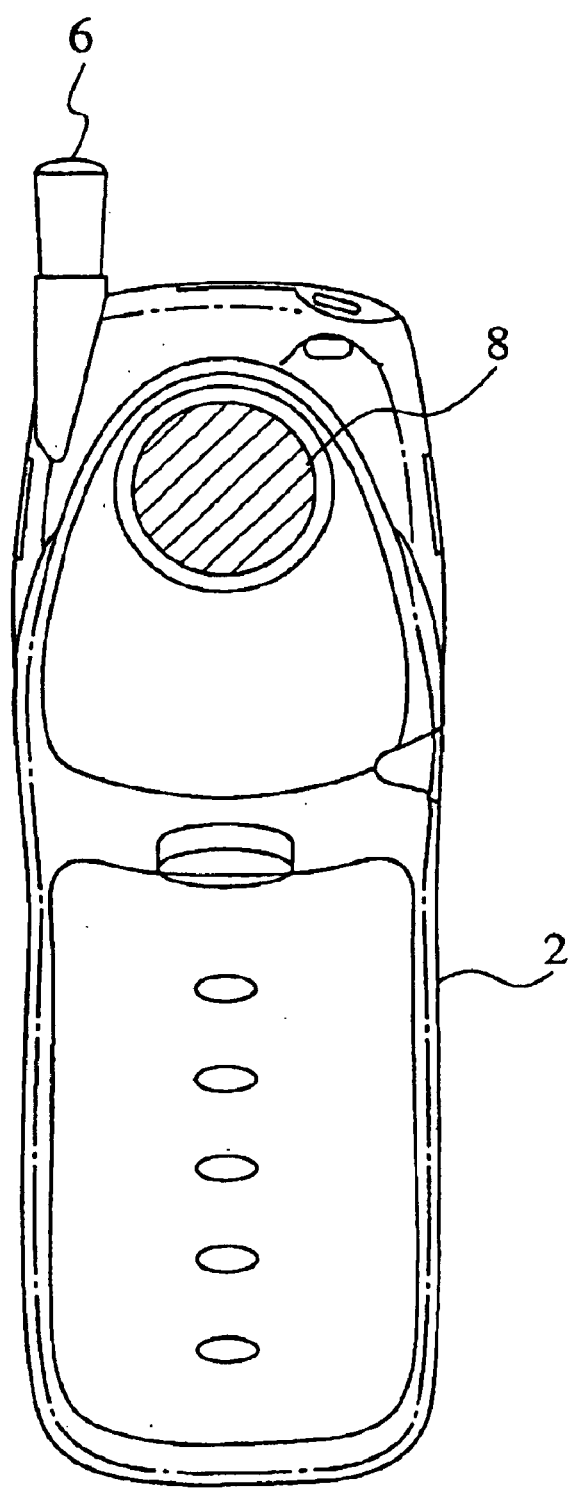
FIG. 2 is a rear view showing the mobile information terminal with its camera section detached.
Figure 3:
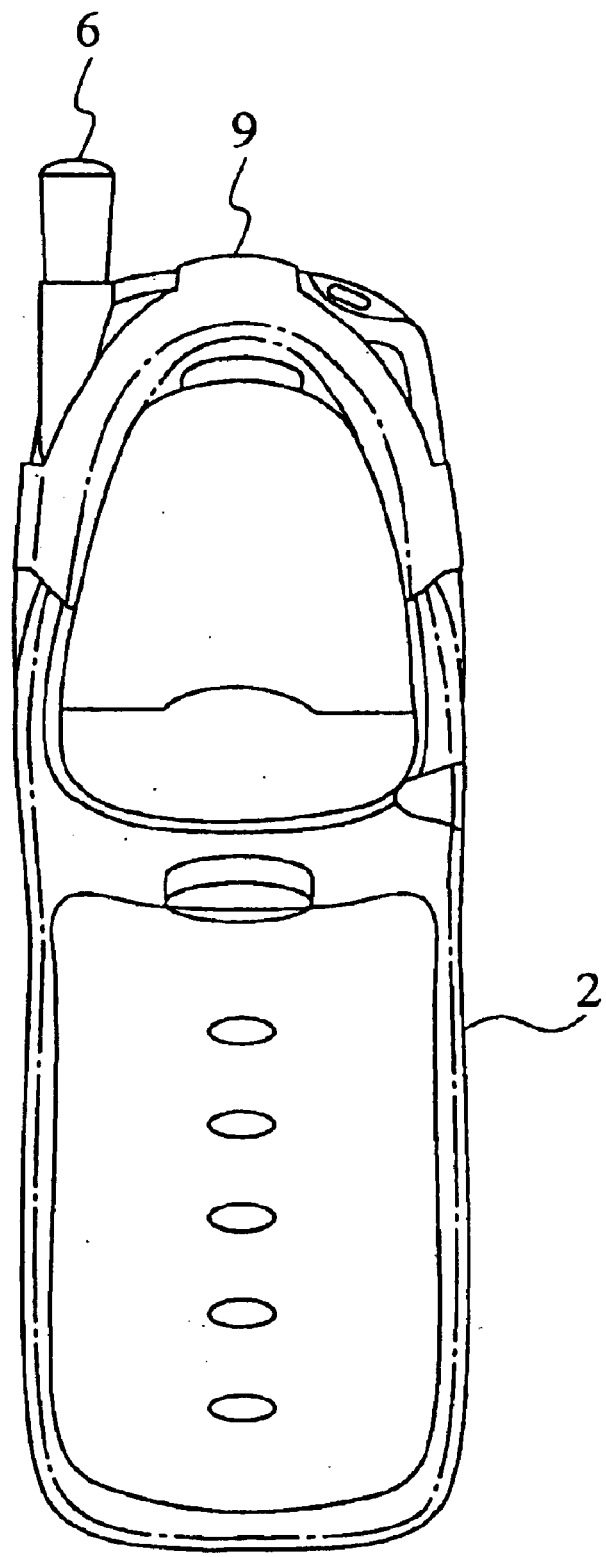
FIG. 3 camera is a rear view showing the mobile information terminal with the camera section loaded but not used.
Figure 4:
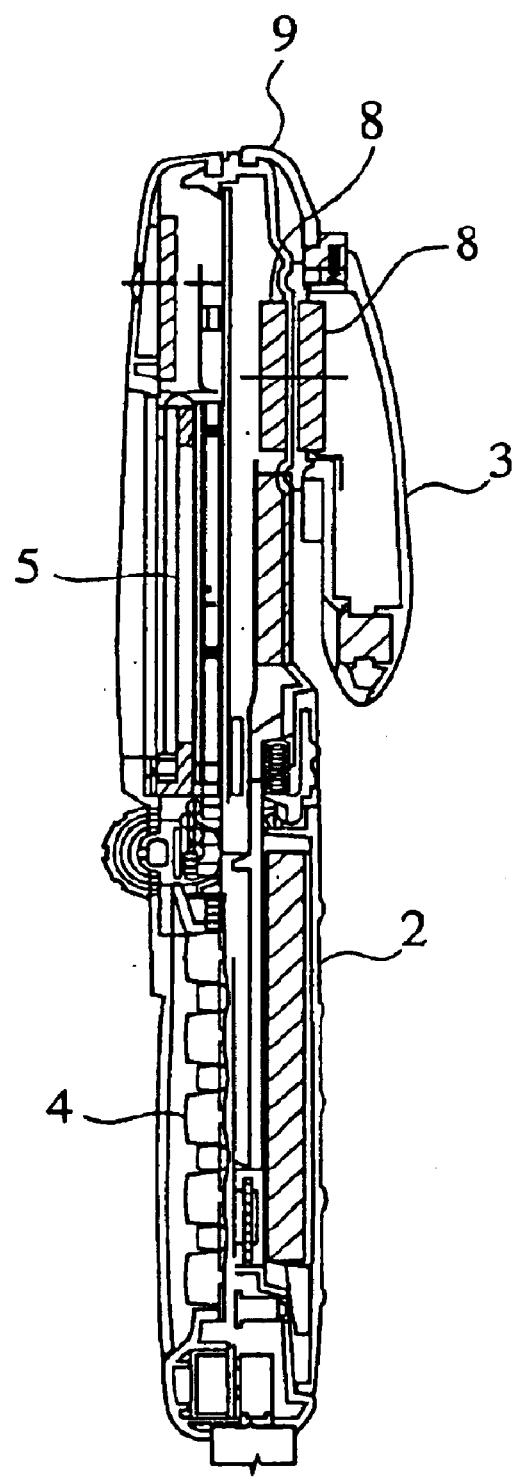
FIG. 4 is a vertical sectional view showing the mobile information terminal with the camera section placed in a contained state.
Figure 5:
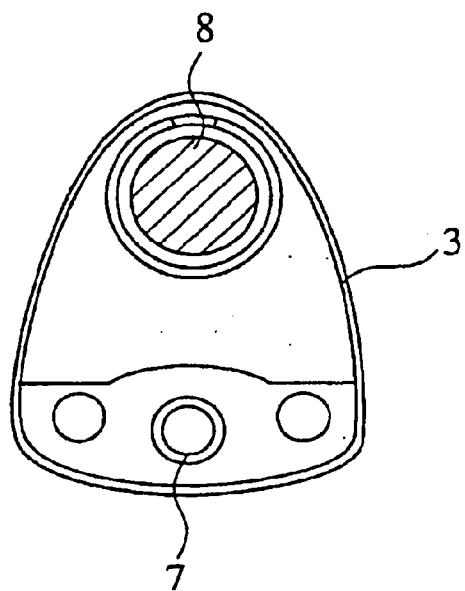
FIG. 5 is a front view showing the camera section.
Figure 6:
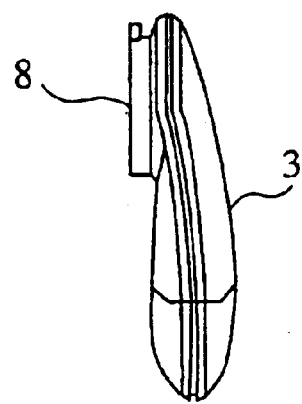
FIG. 6 is a side view showing the camera section.

FIG. 1 is a front view showing a mobile information terminal of an embodiment 1 in accordance with the present invention, in which a camera section is loaded on the body of a cellular phone in an operating state; FIG. 2 is a rear view showing the mobile information terminal without its camera section; FIG. 3 is a rear view showing the mobile information terminal with the camera section loaded but not used; FIG. 4 is a vertical sectional view showing the mobile information terminal with the camera section placed in a contained state; FIG. 5 is a front view showing the camera section; and FIG. 6 is a side view showing the camera section. In these figures, the reference numeral 1 designates a cellular phone; 2 designates a mobile main device (main device); and 3 designates a camera section (attachment device). In the mobile main device 2, the reference numeral 4 designates an operation input section with a cover; 5 designates a display panel for displaying characters and images; and 6 designates an antenna for transmitting and receiving radio waves. In the camera section 3, the reference numeral 7 designates a camera lens. In both the mobile main device 2 and camera section 3, the reference numeral 8 designates a noncontact transmitting unit mounted on the opposite side of the mobile main device 2 and camera section 3, for transmitting power and signals using the electromagnetic induction effect; and 9 designates an loading/unloading device for attaching the removable camera section 3 to the mobile main device 2.

Figure 7A:
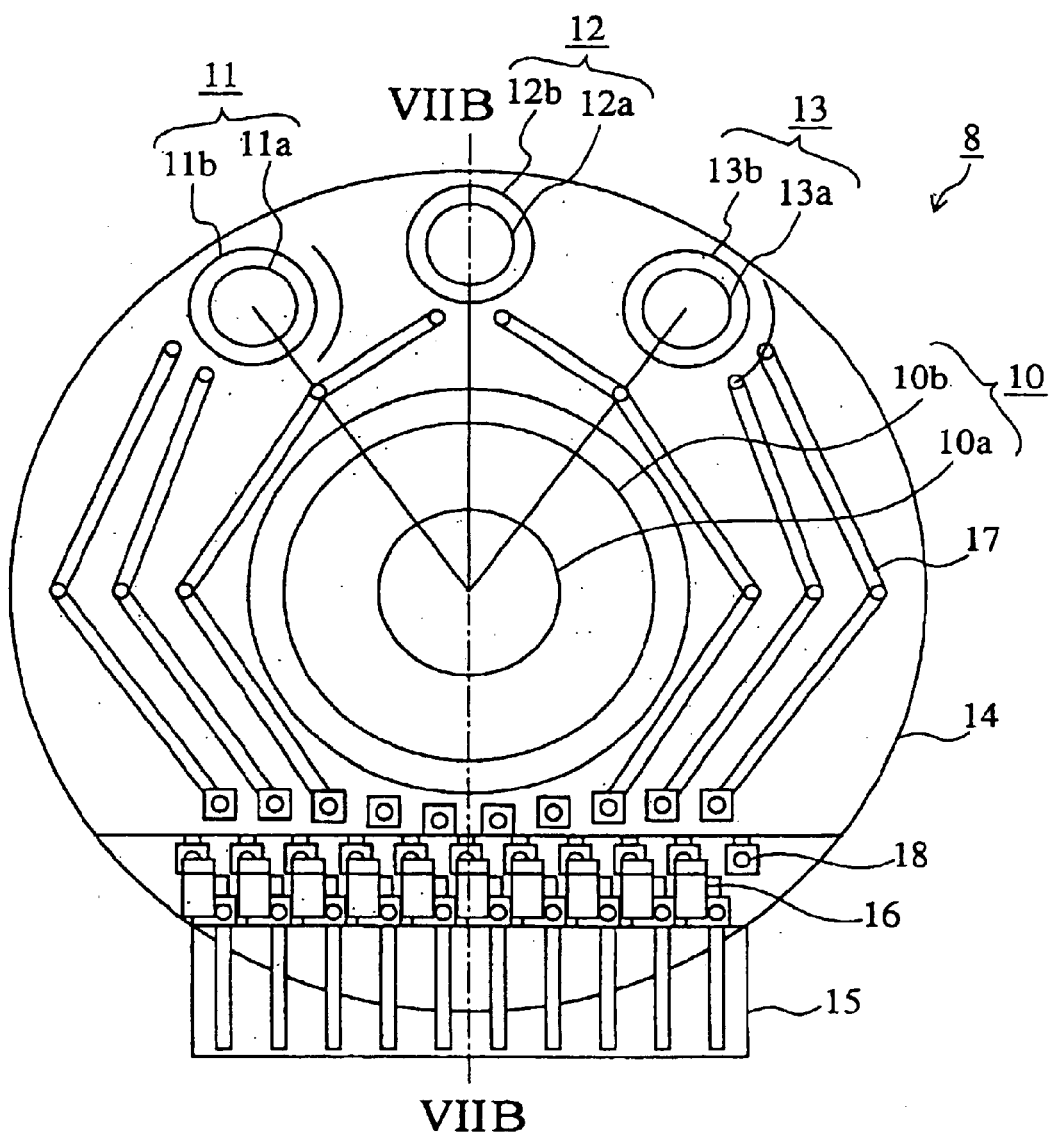
FIG. 7A is a plan view showing a noncontact transmitting unit of the mobile information terminal in the embodiment 1 in accordance with the present invention.
Figure 7B:
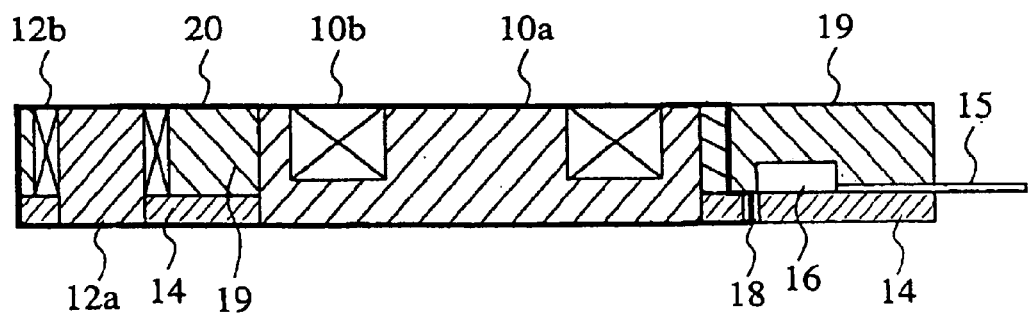
FIG. 7B is a cross-sectional view taken along the line VIIB—VIIB of FIG. 7A.

FIGS. 7A and 7B are a plan view and a cross-sectional view showing the noncontact transmitting unit of the mobile information terminal in the present embodiment 1, respectively, which show the detail of the noncontact transmitting unit 8 as shown in FIG. 4. In these figures, the reference numeral 10 designates a noncontact connector including a first core 10a and a power coil 10b wound thereon; and 11–13 each designates a noncontact connector. Here, the noncontact connector 11 includes a second core 11a and a control signal coil (signal coil) 11b wound thereon; the noncontact connector 12 includes a second core 12a and a clock signal coil (signal coil) 12b wound thereon; and the noncontact connector 13 includes a second core 13a and video signal coil (signal coil) 13b wound thereon. In this example, the signal coils 11b–13b are disposed around the power coil 10b such that they have a space of 1.5 mm between them, making an angle of 34 degrees with each other.

The reference numeral 14 designates a circuit board incorporating the power coil 10b and signal coils 11b–13b together with their cores, and conductor patterns 17 and ground through holes 18; 15 designates an FPC (Flexible Printed Circuit) for transmitting signals to the conductor patterns 17; each reference numeral 16 designates a chip capacitor for feeding an antenna signal passing through the FPC 15 back to the ground through the ground through holes 18; the reference numeral 19 designates a molding resin for integrating these components; and 20 designates a metallic thin-film shield applied on the molding resin 19 with such a thickness as can prevent the transmitted and received signals by the antenna 6 from penetrating the metallic thin-film shield 20. For example, when using copper as a material of the metallic thin-film shield 20 in the condition of the antenna frequency of about 2 GHz and the power transmission frequency of about 500 kHz, it is preferable that the skin depth of the metallic thin-film shield 20 be 2–3 $\mu$m corresponding to the skin depth of the antenna. It is obvious that any materials other than copper, such as gold, silver or aluminum, are applicable to the metallic thin-film shield 20 as long as they have shield effect against radio waves. Since they have different skin depths, it is obvious that their film thickness varies.

Figure 8:
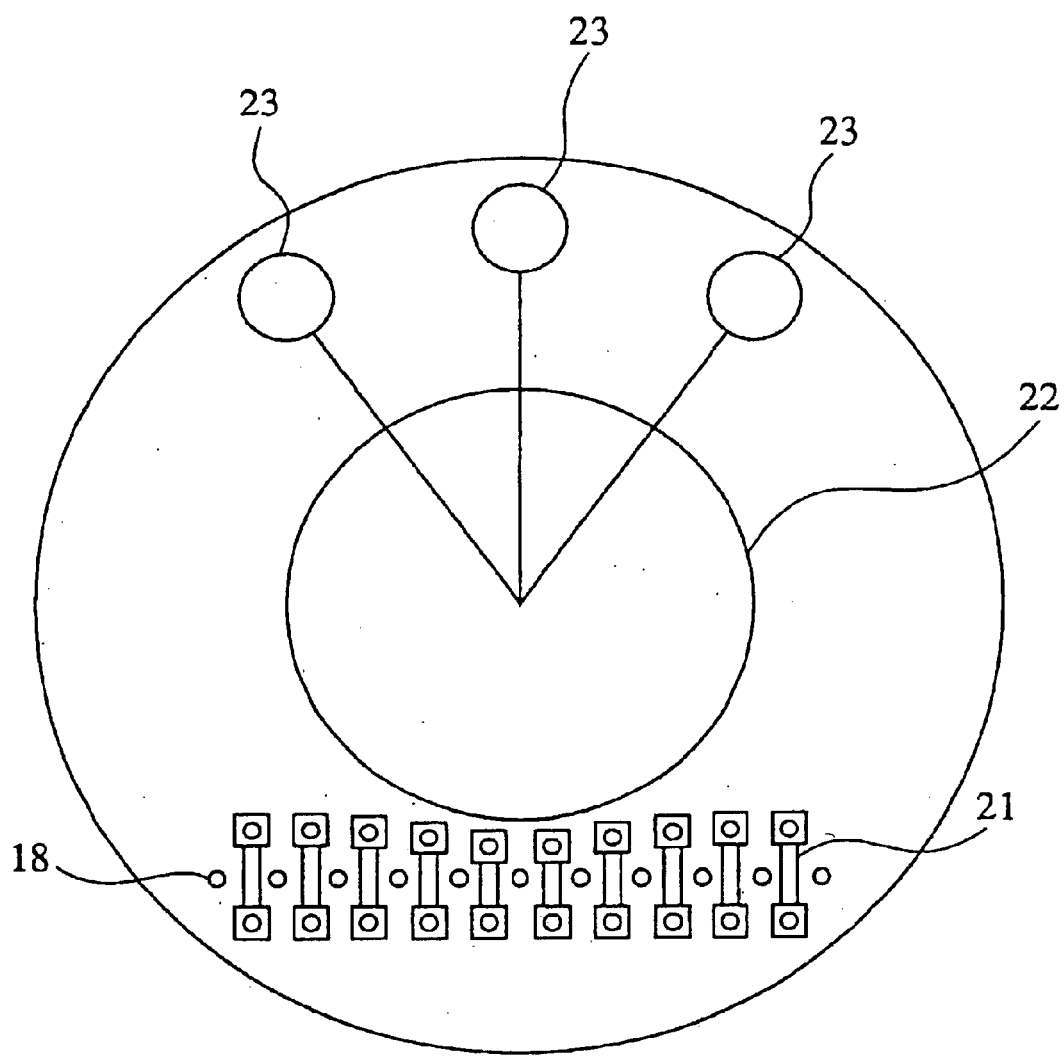
FIG. 8 is a cross-sectional view showing an internal layer of a double-layer circuit board of the noncontact transmitting unit.

In addition, in the present embodiment 1, the circuit board 14 consists of a double-layer circuit board. FIG. 8 shows conductor patterns 21 formed on its internal layer, in which each reference numeral 18 designates the ground through hole; the reference numeral 22 designates an insertion hole of the power coil 10b; and reference numerals 23 designate insertion holes of the signal coils 11b–13b.

Figure 9:
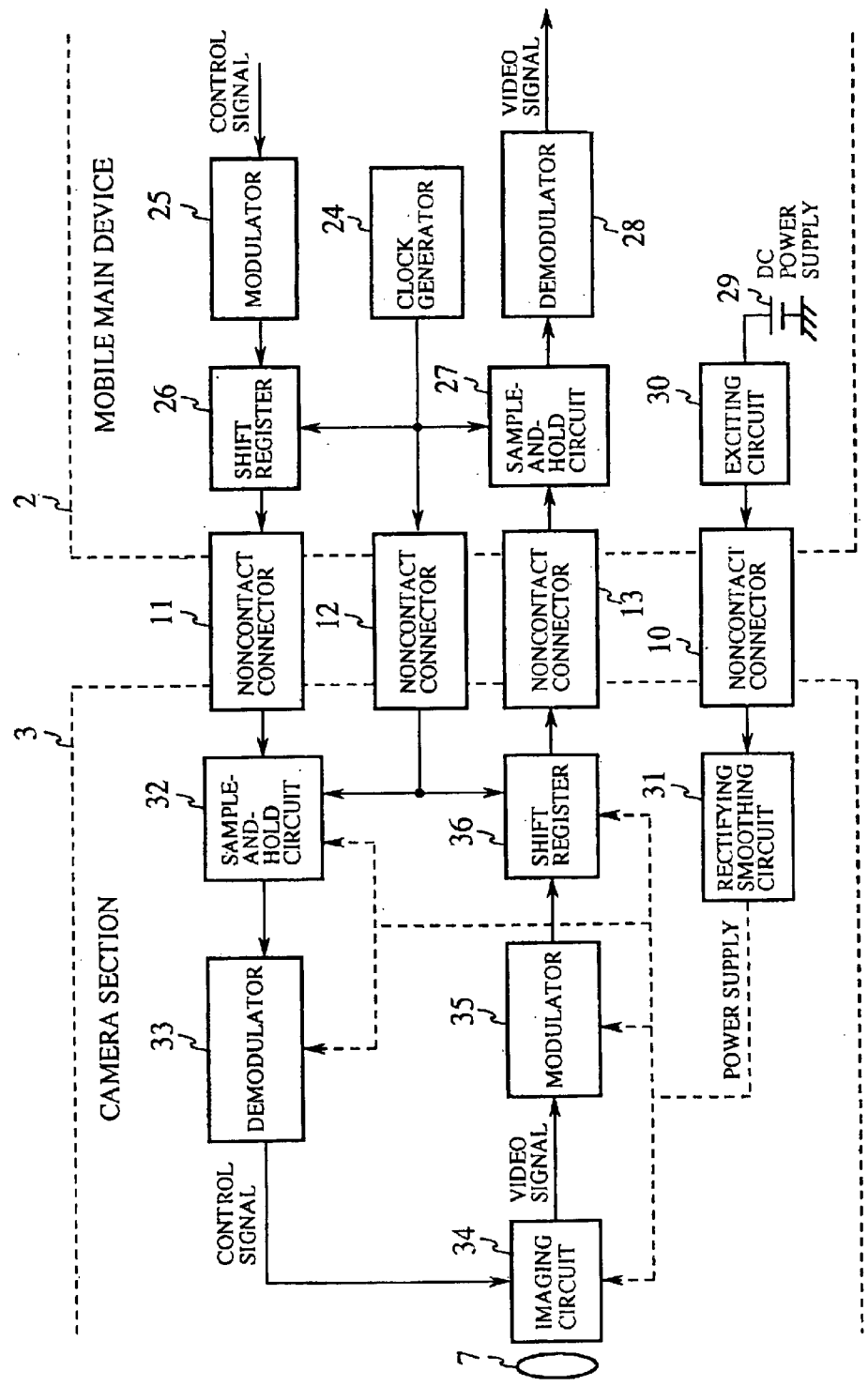
FIG. 9 is a block diagram showing an entire configuration of the mobile information terminal in the embodiment 1 in accordance with the present invention.

FIG. 9 is a block diagram showing an entire configuration of the mobile information terminal of the embodiment 1 in accordance with the present invention. In FIG. 9, the reference numeral 2 designates the mobile main device; 3 designates the camera section; 10 designates the power noncontact connector; 11–13 designate the control signal noncontact connector, clock signal noncontact connector and video signal noncontact connector, respectively, which correspond to those of FIGS. 7A and 7B.

In the mobile main device 2, the reference numeral 24 designates a clock generator; 25 designates a modulator for modulating a control signal; and 26 designates a shift register for supplying the control signal to the noncontact connector 11. The reference numeral 27 designates a sample-and-hold circuit for outputting a video signal in synchronism with the clock signal; and 28 designates a demodulator for demodulating the video signal. The reference numeral 29 designates a DC power supply like a battery; and 30 designates an exciting circuit for converting the DC power to AC power and for supplying it to the noncontact connector 10.

In the camera section 3, the reference numeral 31 designates a rectifying-smoothing circuit for rectifying and smoothing the AC power fed through the noncontact connector 10 to supply its output to the circuits within the camera section 3 as DC power; 32 designates a sample-and-hold circuit for outputting the control signal in synchronism with the clock signal; and 33 designates a demodulator for demodulating the control signal. The reference numeral 7 designates the camera lens; 34 designates an imaging circuit for converting an image of a subject picked up through the camera lens 7 into a video signal; 35 designates a modulator for modulating the video signal; and 36 designates a shift register for supplying the video signal to the noncontact connector 13 in synchronism with the clock signal.

FIG. 10 is a cross-sectional view illustrating the operation principle of the noncontact transmitting apparatus of the mobile information terminal of the embodiment 1 as shown in FIGS. 7A and 7B. In FIG. 10, reference numerals 37 designate a pair of cores disposed oppositely on the mobile main device 2 and camera section 3; 38 designate coils wound on the cores 37; and the 39 designates magnetic flux generated by the coils 38.

Figure 11A:
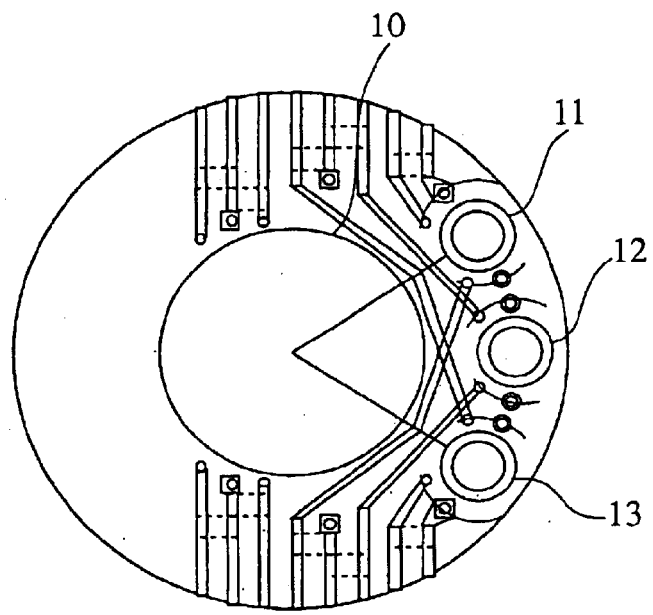
FIGS. 11A and 11B are schematic views showing a connected state of the noncontact transmitting units of the mobile information terminal in the embodiment 1 in accordance with the present invention.
Figure 11B:
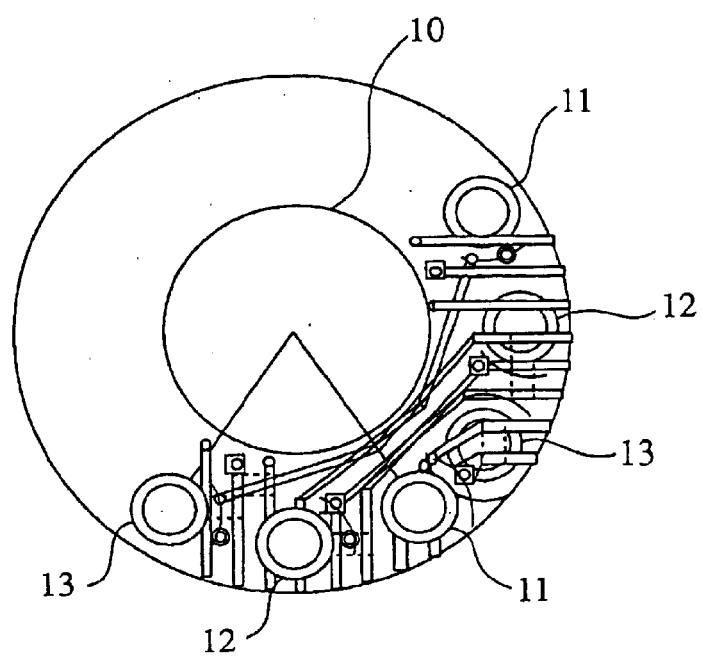

FIGS. 11A and 11B are schematic diagrams illustrating the connected state of the noncontact transmitting units of the mobile information terminal in the embodiment 1 in accordance with the present invention, wherein FIG. 11A illustrates the operation state of the noncontact connectors 10–13 mounted on the mobile main device 2 and camera section 3; and FIG. 11B illustrates their contained state. In the operating state as illustrated in FIG. 11A, the noncontact connectors 10–13 are exactly facing, whereas in the contained state in which they are rotated by 90 degrees as illustrated in FIG. 11B, the noncontact connectors 11–13 are displaced.

Next, the operation of the present embodiment 1 will be described.

As shown in FIG. 2, the mobile main device 2 of the mobile information terminal of the present embodiment 1 can be used by itself as the cellular phone 1 with the antenna 6. In addition, since the camera section 3 can be supplied with the power and the control signals, it can be used in conjunction with other apparatus that can receive the video signal from the camera section 3.

In order to add, to the ordinary cellular phone function, the function of transmitting the video signal captured by the camera, the camera section 3 is loaded on the mobile main device 2 through the loading/unloading device 9 as shown in FIGS. 3 and 4. Then, the camera section 3 is rotated to place the camera lens 7 in the operating position as shown in FIG. 1, making it possible for the display panel 5 to display images captured through the camera lens 7 to be monitored, or for the display panel 5 of a party cellular phone 1 to display the images transmitted thereto through the antenna 6 by radio.

Next, the operation of the present embodiment 1 will be described with reference to FIG. 9 showing the entire configuration. In the mobile main device 2, the modulator 25 modulates the control signal generated by manipulating the operation input section 4 and the like, and the shift register 26 supplies the control signal to the control signal noncontact connector 11 in synchronism with the clock signal. The exciting circuit 30 converts the DC power fed from the DC power supply 29 to the AC power, and supplies it to the power noncontact connector 10.

On the other hand, in the camera section 3, the rectifying-smoothing circuit 31 rectifies and smoothes the AC power fed through the noncontact connector 10, and supplies it to the circuits within the camera section 3 as the DC power supply. The sample-and-hold circuit 32 outputs the control signal fed from the noncontact connector 11 in synchronism with the clock signal. The demodulator 33 demodulates the control signal, and supplies the control signal to the imaging circuit 34. In response to the control signal, the imaging circuit 34 converts the image of the subject captured through the camera lens 7 into the video signal, and the modulator 35 modulates the video signal. The shift register 36 supplies the video signal modulated by the modulator 35 to the video signal noncontact connector 13 in synchronism with the clock signal. Returning to the mobile main device 2, again, the sample-and-hold circuit 27 supplies the video signal fed from the noncontact connector 13 to the demodulator 28 in synchronism with the clock signal. The demodulator 28 demodulates the video signal so that the display panel 5 displays the video signal, or the antenna 6 transmits the video signal to the party cellular phone 1 by radio.

Incidentally, the modulators 25 and 35 can also transmit the digital control signal and video signal without any obstacle through the noncontact transmitting units 8 utilizing the electromagnetic induction effect by modulating these signals into return-to-zero waveforms.

Next, the operation of the noncontact signal transmission based on the electromagnetic induction will be described with reference to FIG. 10. As illustrated in FIG. 10, the core 37 and coil 38 wound thereon, which constitute the noncontact transmitting unit 8, are installed on both the mobile main device 2 and camera section 3. As illustrated in FIG. 10, supplying the coil 38 on the mobile main device 2 with one of the signals or the power will generate in the core 37 the magnetic flux 39 corresponding to the supply, and form a linkage of the magnetic flux 39 between the opposing cores 37, thereby generating in the coil 38 on the camera section 3 side the signal or power corresponding to the input. Thus, the electromagnetic induction effect can produce the output corresponding to the input without any contact. Likewise, a signal input to the camera section 3 will generate a signal corresponding to the input signal in the opposing coil 38 on the mobile main device 2 side by the electromagnetic induction, making it possible to transmit the signal without any contact.

In this way, when loading the mobile main device 2 with the camera section 3, the noncontact transmitting units 8 can transfer the control signal, clock signal and video signal between the mobile main device 2 and the camera section 3, as well as the power, satisfying the required functions.

Next, the housing operation of the camera section 3 will be described. To use the camera, the camera section 3 is placed at the position as shown in FIG. 1 so that the camera lens 7 is brought into view out of the mobile main device 2. In this case, as shown in FIG. 11A, the noncontact transmitting units 8 are placed such that their power noncontact connectors 10 and three signal noncontact connectors 11–13 on both sides of the mobile main device 2 and the camera section 3 are aligned perfectly to transfer the power and signals. In contrast, to house the camera section 3 as shown in FIGS. 3 and 4, the camera section 3 is rotated by 90 degrees so that the camera lens 7 is hidden in the mobile main device 2 to protect the camera lens 7 and to remove the projection, thereby making convenient for carrying. Thus, in the contained state, the noncontact transmitting units 8 are placed as shown in FIG. 11B such that only the power noncontact connectors 10 of the mobile main device 2 and camera section 3 are aligned, but their three signal noncontact connectors 11–13 are not. Accordingly, when the receiving side noncontact connectors 11–13 do not generate any current due to the electromagnetic induction, a decision is made that the camera section 3 is in the contained state, so that the power supply from the mobile main device 2 to the camera section 3 is halted, and the cellular phone 1 sets the camera section 3 in a disabled mode. This processing is carried out by the diagnosis of the demodulator 28 as shown in FIG. 9. On the contrary, when using the camera, the camera is set in a camera enabled mode by operating key-pads on the cellular phone 1, and the camera section 3 is rotated by 90 degrees in the opposite direction so that the camera lens 7 is brought into view. Thus, the power is supplied from the mobile main device 2 to the camera section 3 through the power noncontact connector 10, and the signals are transferred between the signal noncontact connectors 11–13. As a result, the camera images are transferred to the mobile main device 2.

As described above, the present embodiment 1 is configured such that although the power noncontact connectors 10 are always opposed to each other, the signal noncontact connectors 11–13 are opposed only in the operating state, but not in the contained state. Accordingly, the coils are either excited completely or not excited at all, which makes it possible to prevent damage to the coil, transmitting and receiving circuits. In addition, since the state of the camera section 3, whether in the operation state or contained state, can be detected using the received signal through the signal noncontact connectors 11–13, a camera position detecting sensor can be eliminated. Although the embodiment 1 is described taking an example using three coils, the control signal coil 11b, clock signal coil 12b and video signal coil 13b, as the signal noncontact connectors 11–13, this is not essential. For example, installing a clock signal regenerator can obviate the transfer of the clock signal, making it possible to reduce the number of the signal coils to two. Likewise, any number of the signal coils can offer a similar effect. In addition, although the embodiment 1 describes the operation state and the 90-degree rotated contained state with the three signal noncontact connectors 11–13, and hence the angle made between the signal noncontact connectors 11–13 is 34 degrees, it is obvious that the rotation angle and the angle between the coils can vary according to the position and structure for mounting the camera to the main device.

Furthermore, since the noncontact transmitting unit 8 of the present embodiment 1 is configured such that its power noncontact connector 10 and signal noncontact connectors 11–13 are embedded in the circuit board 14 having the conductor patterns 17 and ground through holes 18, and integrated with the molding resin 19, it has an advantage of being able to shrink its size, thereby facilitating its mounting. Moreover, the molding resin 19, which is completely covered with the metallic thin-film shield 20, can prevent the degradation in the electrical characteristics of the antenna 6. To connect the power line and signal lines to the power coil 10b and signal coils 11b–13b, through holes must be bored in the metallic thin-film shield 20 at the FPC 15, in which case the antenna current will flow into the metallic thin-film shield 20 through the power line and the signal lines, impairing the antenna characteristics (efficiency and radiation pattern). In view of this, the noncontact transmitting unit 8 of the present embodiment 1 comprises, at the positions the power line and signal lines pass through the metallic thin-film shield 20, the chip capacitors 16 that bring the resistance between these lines and the ground to zero at the radio frequencies used by the antenna to cause the antenna current to flow outside the metallic thin-film shield 20, thereby preventing the antenna current from flowing into the metallic thin-film shield 20. In addition, the circuit board 14 is provided with ground through holes 18 which can prevent the antenna current from flowing into the noncontact transmitting unit 8 from a narrow space for passing the FPC 15. Connecting the top and bottom surfaces of the metallic thin-film shield 20 via the ground through holes 18 can produce a lattice-like shield in that narrow space, making it possible to prevent the antenna current from flowing inside the metallic thin-film shield 20 through the narrow space. The spacing between the ground through holes 18 to prevent the antenna current from flowing into the shield depends on the antenna frequency. For example, 1–2 mm wide spacing is enough for the antenna frequency of 2 GHz.

Moreover, since the circuit board 14 of the noncontact transmitting unit 8 of the embodiment 1 consists of the double-layer circuit board as described above, the spacing between the conductor patterns 21 and the ground through holes 18 can be reduced, offering an advantage of being able to shrink the size of the noncontact-transmitting unit 8.

Embodiment 2

Figure 12A:
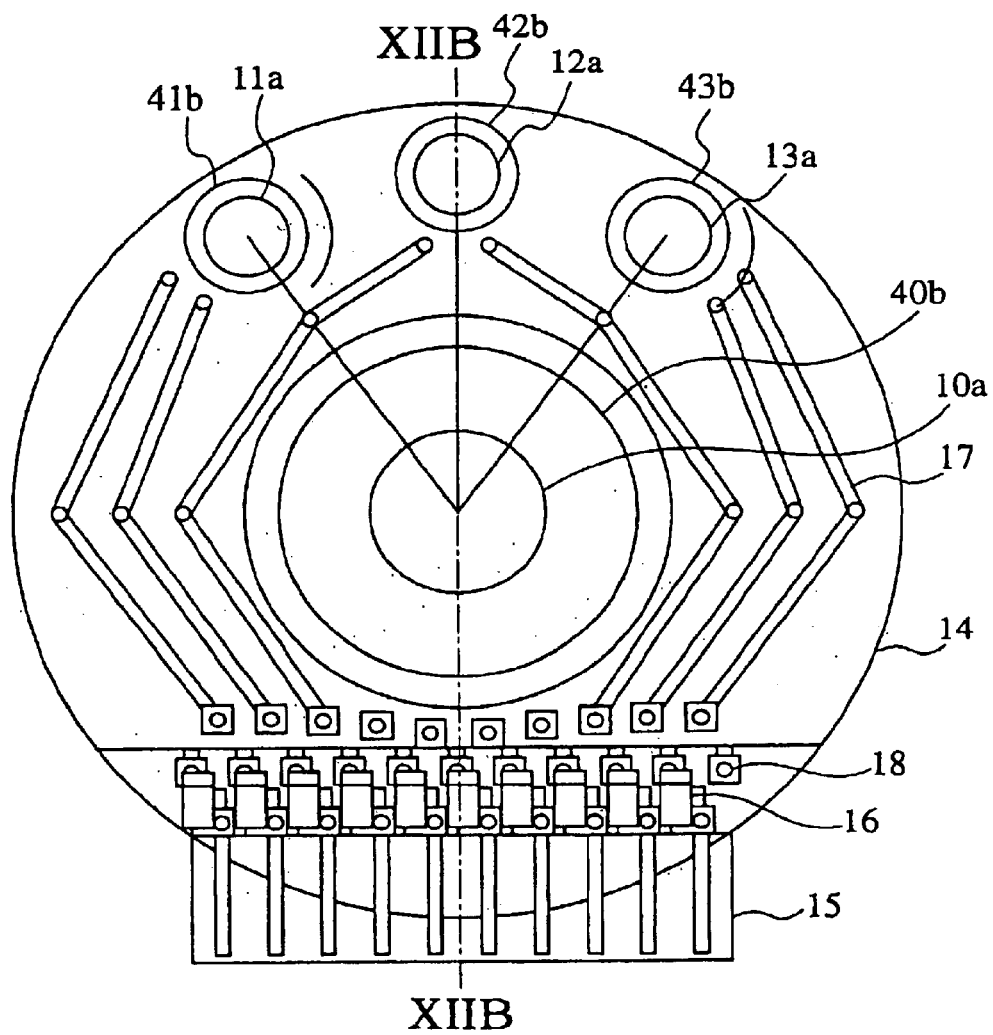
FIG. 12A is a plan view showing a noncontact transmitting unit of the mobile information terminal of an embodiment 2 in accordance with the present invention.
Figure 12B:
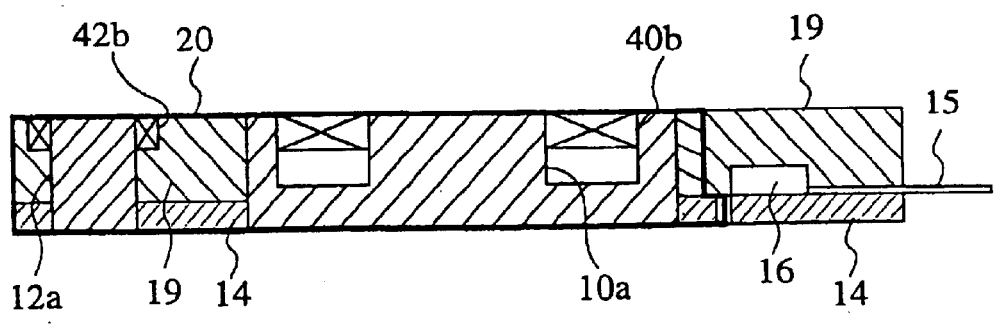
FIG. 12B is a cross-sectional view taken along the line XIIB—XIIB of FIG. 12A.

FIGS. 12A and 12B are a plan view and a cross-sectional view showing the noncontact transmitting unit of the mobile information terminal of an embodiment 2 in accordance with the present invention. In these figures, the reference numeral 40b designates a power coil wound on a portion of the core 10a close to the facing surface (top surface); and 41b–43b designate signal coils wound on portions of the cores 11a–13a close to the facing surface. In FIGS. 12A and 12B, the same or like portions to those of FIGS. 7A and 7B are designated by the same reference numerals, and the description thereof is omitted here.

Next, the operation of the present embodiment 2 will be described.

In the present embodiment 2 as shown in FIGS. 12A and 12B, the power coil 40b and the signal coils 41b–43b are disposed close to the facing surface. Accordingly, the ratio of the leakage inductance to the total inductance of each coil becomes smaller than that of its counterpart of FIGS. 7A and 7B, increasing the efficiency of the noncontact transmitting unit 8.

Figure 13A:
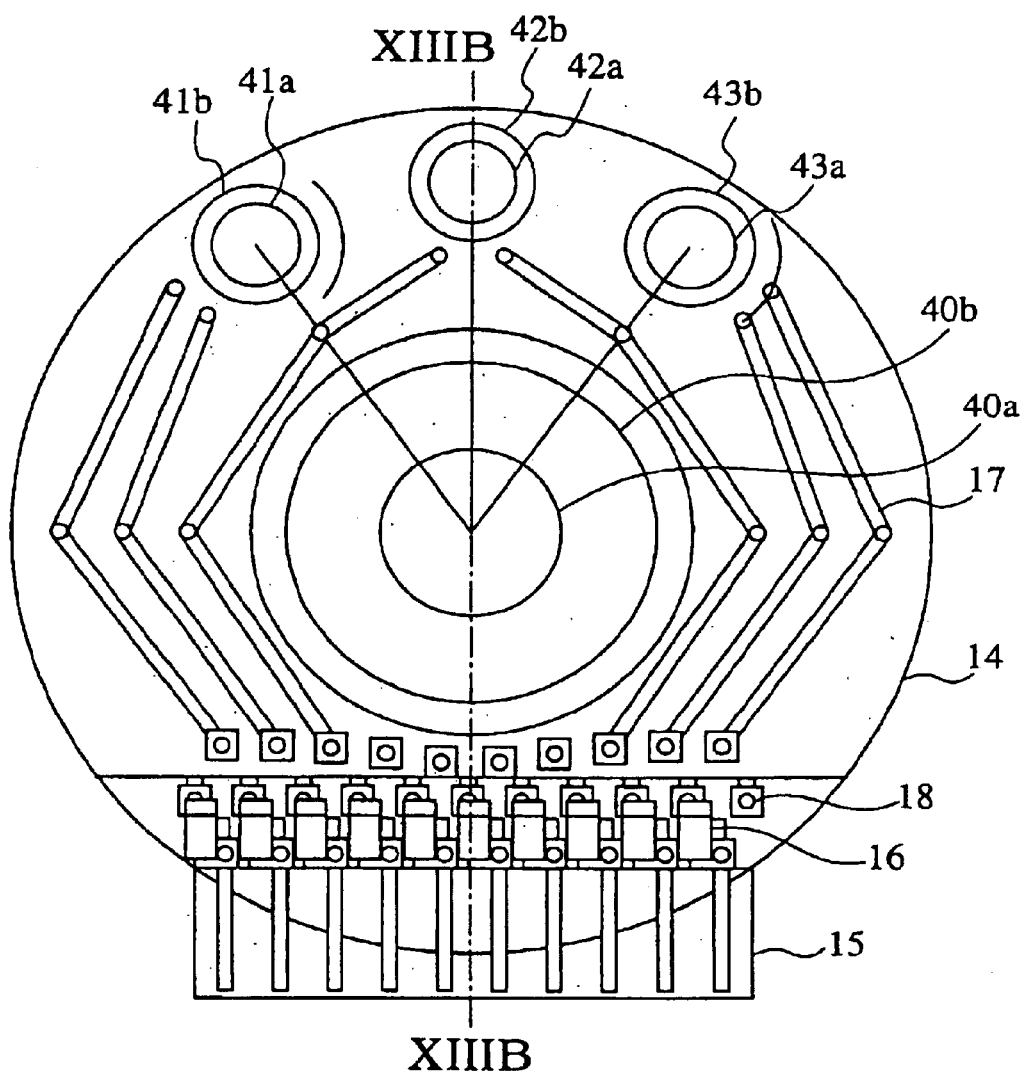
FIG. 13A is a plan view showing another noncontact transmitting unit of the mobile information terminal of the embodiment 2 in accordance with the present invention.
Figure 13B:
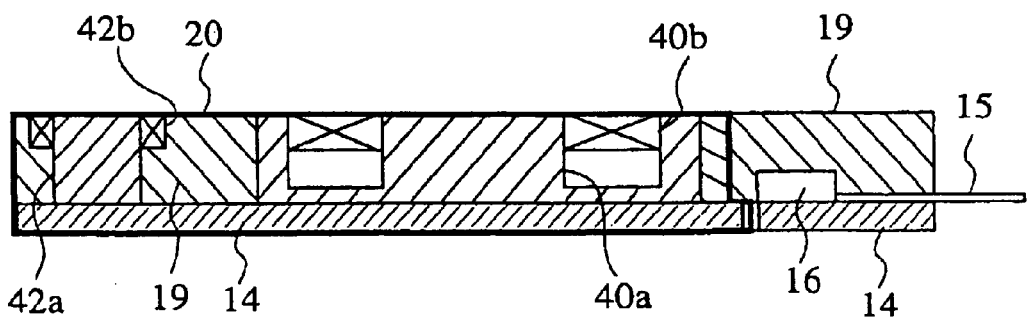
FIG. 13B is a cross-sectional view taken along the line XIIIA—XIIIA of FIG. 13A.

Incidentally, although the power core 10a and the signal cores 11a–13a of FIGS. 12A and 12B are as tall as those of the embodiment 1, this is not essential. For example, as shown in FIGS. 13A and 13B as a power core 40a and signal cores 41a–43a, they can be made shorter and formed on the surface of the circuit board 14 instead of being buried therein, offering a similar effect.

Embodiment 3

Figure 14A:
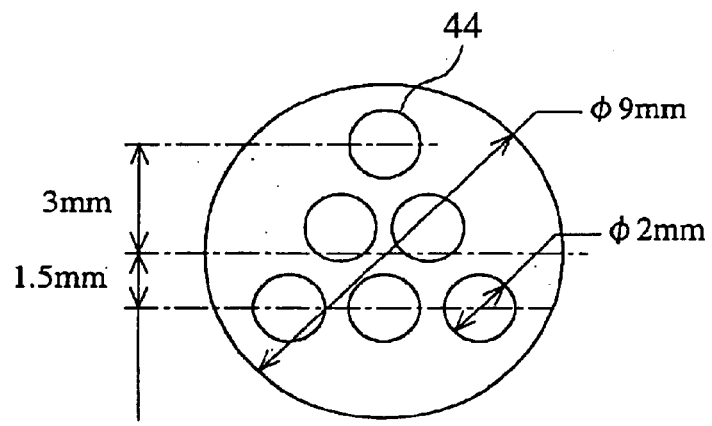
Figure 14B:
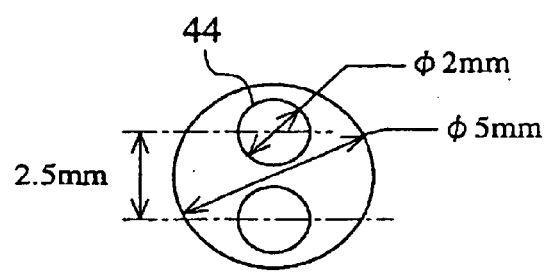

FIGS. 14A and 14B are plan views showing shield patterns on the facing surface of the metallic thin-film shield 20 of the noncontact transmitting unit 8 of an embodiment 3 in accordance with the present invention, wherein FIG. 14A shows the pattern of the power noncontact connector; and FIG. 14B shows the pattern of one of the signal noncontact connectors. In these figures, each reference numeral 44 designates a hole 2 mm in diameter formed in the metallic thin-film shield 20. In these hole, the metallic thin-film shield 20 is not formed.

Next, the operation of the present embodiment 3 will be described.

The holes 44 as shown in FIGS. 14A and 14B are formed to prevent eddy current from flowing in the surface of the metallic thin-film shield 20. They can prevent the eddy-current loss, offering an advantage of being able to increase the efficiency of the noncontact transmitting unit 8. At the 2 GHz antenna frequency, the holes 2 mm in diameter do not bring about the degradation in the antenna characteristics because the antenna signal does not penetrate through the holes.

Embodiment 4

Figure 15:
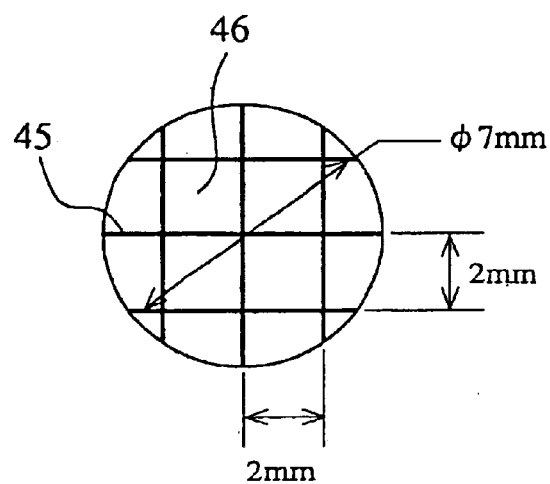
FIG. 15 is a plan view showing a shield pattern of the facing surface of a metallic thin-film shield formed on the noncontact transmitting unit of an embodiment 4 in accordance with the present invention.

FIG. 15 is a plan view showing a shield pattern on the facing surface of the metallic thin-film shield 20 of the noncontact transmitting unit 8 of an embodiment 4 in accordance with the present invention. In FIG. 15, the reference numeral 45 designates a lattice-like metallic thin-film shield with square holes 46 formed as the metallic thin-film shield 20.

As in the embodiment 3, the square holes 46 formed in the metallic thin-film shield 20 prevent the eddy current from flowing through the surface of the metallic thin-film shield 20. Thus, they can prevent the eddy-current loss, offering an advantage of being able to increase the efficiency of the noncontact transmitting unit 8. In addition, the lattice-like shield patterns can facilitate forming and positioning of the patterns.

Embodiment 5

Figure 16A:
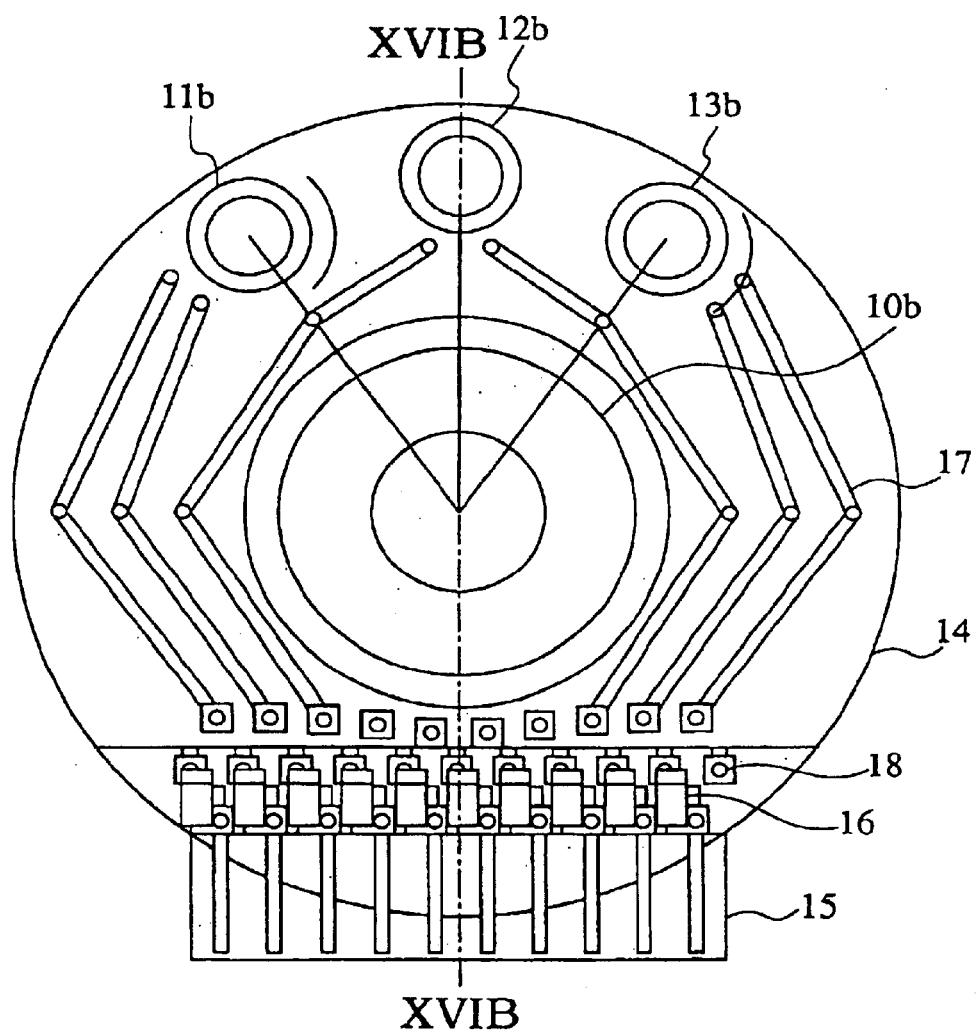
FIG. 16A is a plan view showing another noncontact transmitting unit of the mobile information terminal of an embodiment 5 in accordance with the present invention.
Figure 16B:
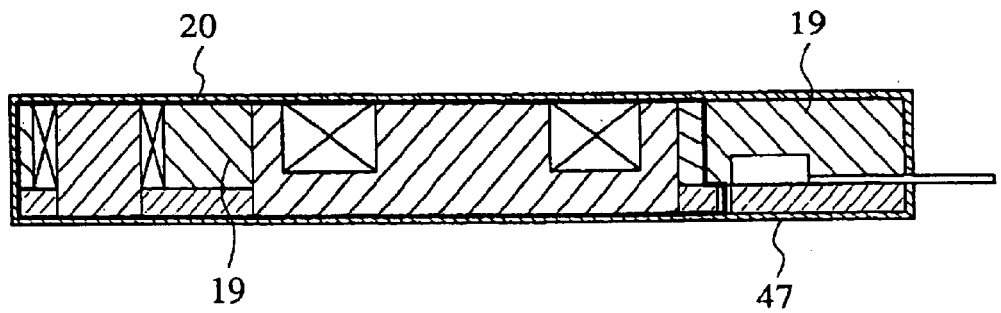
FIG. 16B is a cross-sectional view taken along the line XVIB—XVIB of FIG. 16A.

FIGS. 16A and 16B are a plan view and a cross-sectional view showing the noncontact transmitting unit of the mobile information terminal of an embodiment 5 in accordance with the present invention. In FIGS. 16A and 16B, the reference numeral 47 designates an insulating coating covering the surface of the metallic thin-film shield 20. Covering the surface of the noncontact transmitting unit 8 with the insulating coating 47 consisting of an epoxy resin or the like as in the present embodiment 5 has an advantage of being able to reduce the size of the device, because the noncontact transmitting unit 8 can also serve as the connector of the camera section 3 of FIG. 6, for example, with the mobile main device 2. Although the insulating coating 47 covers the entire metallic thin-film shield 20 in FIG. 16B, it is not essential. For example, only portions meeting the outside can be covered with the insulating coating 47, offering a similar effect. The material of the insulating coating 47 is not limited to the epoxy resin. Any insulating materials are applicable as long as they are resistant to abrasion resulting from sliding, contact and the like with the outside.

Embodiment 6

Figure 17:
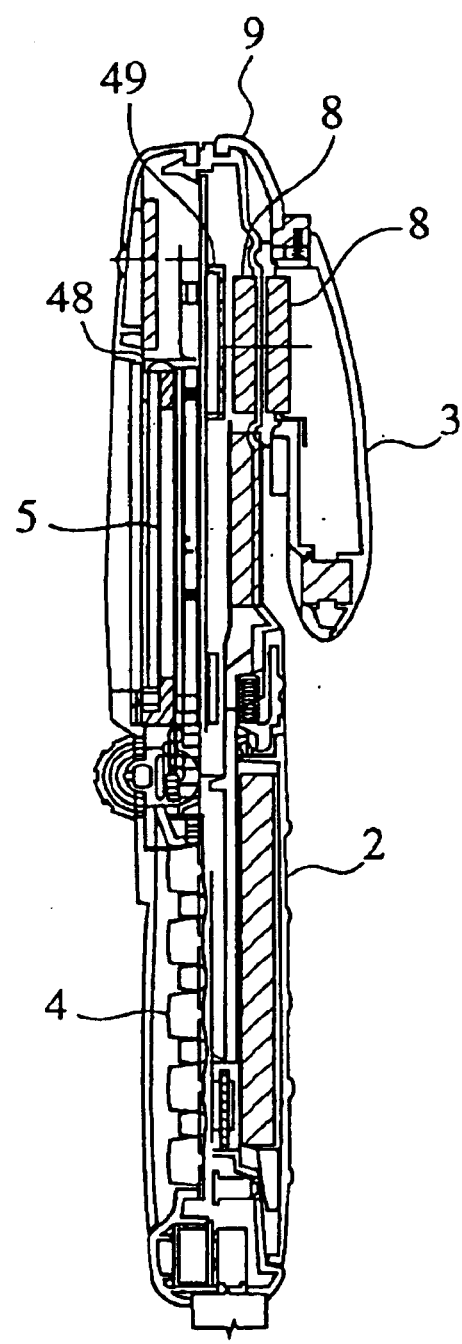
FIG. 17 is a vertical sectional view showing a cellular phone and a camera section into which the noncontact transmitting apparatus of an embodiment 6 in accordance with the present invention is incorporated.

FIG. 17 is a vertical sectional view showing the mobile main device and camera section incorporating the noncontact transmitting units 8 of an embodiment 6 in accordance with the present invention. In FIG. 17, the reference numeral 48 designates an RF circuit, and 49 designates a magnetic shield composed of soft magnetic material. The magnetic shield 49, which is composed of a soft magnetic material like permalloy and inserted between the RF circuit 48 and the back of the noncontact transmitting unit 8 as shown in FIG. 17, can reduce the effect on the RF circuit 48 by the eddy magnetic flux arising from the noncontact transmitting unit 8, offering an advantage of being able to prevent the noncontact transmitting unit 8 from interfering the RF circuit 48. The material of the magnetic shield 49 is not limited to permalloy. Any materials such as a silicon steel plate are applicable as long as they have magnetic shield effect with offering similar advantage.

What is claimed is:

1. A noncontact transmitting apparatus comprising:
   a first noncontact transmitting unit mounted on a main device; and
   a second noncontact transmitting unit mounted on an attachment device, said second noncontact transmitting unit being removably attachable to said first noncontact transmitting unit, for enabling noncontact signal transfer between said main device and said attachment device, wherein each of said first and second noncontact transmitting units comprises:
   a power coil wound on a first core to supply power from said main device to said attachment device by electromagnetic induction, wherein said first core of said first noncontact transmitting unit and said first core of said second noncontact transmitting unit face each other when said attachment device is attached to said main device; and
   at least one signal coil wound on at least one second core for signal transfer between said main device and said attachment device by electromagnetic induction, wherein, when said attachment device is attached to said main device, said second core of said first noncontact transmitting unit and said second core of said second noncontact transmitting unit may, selectively,
      face each other, at a first position, for signal transmission between said signal coils by electromagnetic induction, and may be displaced from each other to a second position, inhibiting signal transmission between said signal coils by electromagnetic induction.

2. The noncontact transmitting apparatus according to claim 1, wherein said second noncontact transmitting unit is rotatably attached to said first noncontact transmitting unit for rotation about said first core, and when said second noncontact transmitting unit is rotated about said first core by a specified angle, said signal coil of said second noncontact transmitting unit is shifted from the first position to the second position and from the second position to the first position.

3. The noncontact transmitting apparatus according to claim 2, wherein each of said noncontact transmitting units further comprises means for fixing in position and integrating said power coil and said signal coil.

4. The noncontact transmitting apparatus according to claim 1, wherein said power coil is disposed close to a facing surface of said first core, and said signal coil is disposed close to a facing surface of said second core.

5. The noncontact transmitting apparatus according to claim 1, wherein said main device further comprises an antenna for transmitting and receiving an antenna signal.

6. The noncontact transmitting apparatus according to claim 5, wherein said first noncontact transmitting unit further comprises a magnetic shield for preventing leakage flux from said first noncontact transmitting unit from affecting a radio frequency circuit in said main device.

7. The noncontact transmitting apparatus according to claim 5, wherein each of said noncontact transmitting units further comprises:
a circuit board that includes, in addition to said power coil and said signal coil, conductor patterns connected to said power coil and said signal coil, and to ground through holes;
a flexible printed circuit for transmitting signals to said conductor patterns; and
chip capacitors for feeding the antenna signal passing through said flexible printed circuit back to ground through the ground through holes.

8. The noncontact transmitting apparatus according to claim 7, wherein each of said noncontact transmitting units further comprises:
means for fixing in position and integrating said power coil, said signal coil, said conductor patterns, and said chip capacitors; and
a metallic film shield covering said noncontact transmitting unit, integrated by said means for fixing and integrating, to prevent the antenna signal from penetrating said noncontact transmitting unit.

9. The noncontact transmitting apparatus according to claim 8, wherein said circuit board includes a double-layer circuit board, and wherein said conductor patterns are located on an internal layer of said double-layer circuit board.

10. The noncontact transmitting apparatus according to claim 5, wherein each of said noncontact transmitting units further comprises means for fixing in position and integrating said power coil and said signal coil.

11. The noncontact transmitting apparatus according to claim 10, wherein each of said noncontact transmitting units comprises a metallic film shield covering said noncontact transmitting unit to prevent the antenna signal from penetrating said noncontact transmitting unit.

12. The noncontact transmitting apparatus according to claim 11, wherein said metallic film shield comprises holes in a facing surface.

13. The noncontact transmitting apparatus according to claim 11, wherein said metallic film shield comprises lattice-like patterns on a facing surface.

14. The noncontact transmitting apparatus according to claim 11, wherein said metallic film shield is covered with an insulating coating.

15. The noncontact transmitting apparatus according to claim 1, wherein said main device consists of a cellular phone and said attachment device comprises a camera.

16. An information system comprising:
a main device;
an attachment device;
a first noncontact transmitting unit mounted on said main device; and
a second noncontact transmitting unit mounted on an attachment device, said second noncontact transmitting unit being removably attachable to said first noncontact transmitting unit, for enabling noncontact signal transfer between said main device and said attachment device, wherein each of said first and second noncontact transmitting units comprises:
a power coil wound on a first core to supply power from said main device to said attachment device by electromagnetic induction, wherein said first core of said first noncontact transmitting unit and said first core of said second noncontact transmitting unit face each other when said attachment device is attached to said main device; and
at least one signal coil wound on at least one second core for signal transfer between said main device and said attachment device by electromagnetic induction, wherein, when said attachment device is attached to said main device, said second core of said first noncontact transmitting unit and said second core of said second noncontact transmitting unit may, selectively,
face each other, at a first position, for signal transmission between said signal coils by electromagnetic induction, and
may be displaced from each other to a second position, inhibiting signal transmission between said signal coils by electromagnetic induction.

* * * * *